United States Patent [19]

Frazier et al.

[11] Patent Number: 5,134,495
[45] Date of Patent: Jul. 28, 1992

[54] RESOLUTION TRANSFORMING RASTER-BASED IMAGING SYSTEM

[75] Inventors: Allen L. Frazier, Derby; James S. Pierson, Augusta, both of Kans.

[73] Assignee: DP-Tek, Inc., Wichita, Kans.

[21] Appl. No.: 610,087

[22] Filed: Nov. 7, 1990

[51] Int. Cl.$^5$ .................. H04N 1/40; G01D 9/42; G01D 15/14
[52] U.S. Cl. .................. 358/298; 358/296; 358/456; 346/108; 346/160
[58] Field of Search .......... 358/296, 298, 302, 456; 355/35; 346/108, 160

[56] References Cited

U.S. PATENT DOCUMENTS

| | | | |
|---|---|---|---|
| 4,437,122 | 3/1984 | Walsh et al. | 346/166 |
| 4,460,909 | 7/1984 | Bassetti et al. | 358/298 X |
| 4,544,264 | 10/1985 | Bassetti et al. | 358/300 X |
| 4,547,812 | 10/1985 | Wauer et al. | 358/298 X |
| 4,625,222 | 11/1986 | Bassetti et al. | 346/160 |
| 4,768,101 | 8/1988 | Webb | 358/298 |
| 4,803,497 | 2/1989 | Kennedy, Jr. et al. | 346/108 |
| 4,835,551 | 5/1989 | Ng | 346/108 |
| 4,847,641 | 7/1989 | Tung | 346/160 X |
| 4,856,920 | 8/1989 | Sanders, Jr. | 346/108 X |
| 4,864,326 | 9/1989 | Kawammura et al. | 358/298 X |
| 4,933,689 | 6/1990 | Yoknis | 346/160 X |
| 5,025,322 | 6/1991 | Ng | 358/298 |

*Primary Examiner*—Benjamin R. Fuller
*Assistant Examiner*—Eric Frahm
*Attorney, Agent, or Firm*—Poms, Smith, Lande & Rose

[57] ABSTRACT

A conventional display device, such as a marking engine for a laser printer or digital copier, having a nominal resolution (where the energy source for the display device can be selectively activated) and a predetermined threshold level for producing output image dots, is modified to a different (higher or lower) resolution or modified to produce output dots along axes different from the axes of the display device (such as for producing halftone screens on angles), by selectively activating the energy source to produce overlap areas that exceed the device threshold and thereby produce dots at positions that are not on the normal resolution positions of the device. Such threshold exceeding overlap areas may be achieved by activating the marking engine's energy source at a plurality of positions, with the energy at some positions being selectively below the threshold level for producing an output dot, but with the combined energy at the desired dot positions being above the threshold level to produce the desired dot. These overlap areas may be produced by modifying the duration that the energy source is activated, by the placement of less than full-extent energy actuation within the pixel extent, by activating the energy source multiple times within a pixel extent, by modulating the intensity of the energy source, and by modulating the shape of the energy cluster that the energy source (or energy beam) produces. For example, a 300×300 laser print engine can be modified to selectively produce 200 or 400 DPI output for fax, 600 or 1200 DPI output for higher resolution printing (as well as the normal 300 DPI printer output). Data compression/decompression techniques can be used to reduce the storage requirements, especially at the higher resolutions.

14 Claims, 11 Drawing Sheets

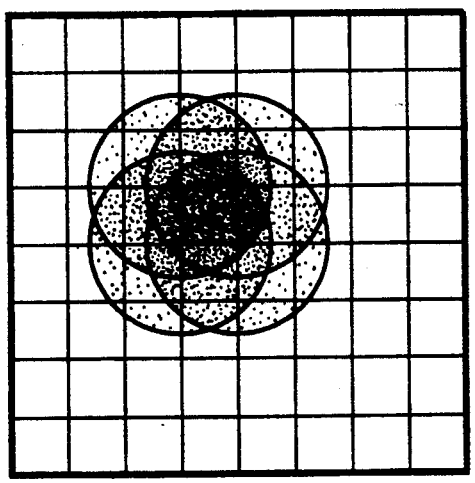
FIG. 6
FIG. 7
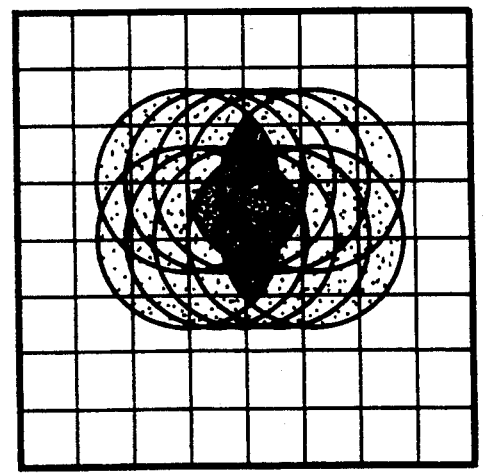
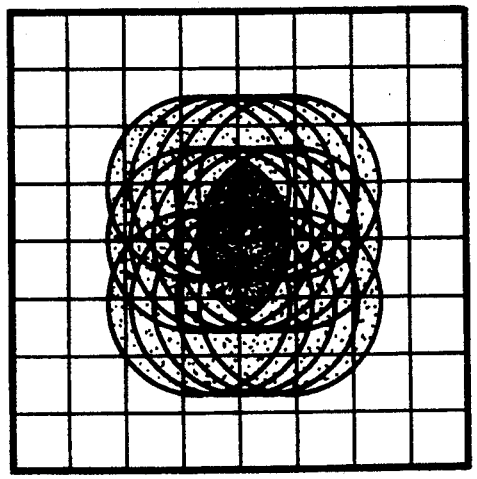
FIG. 8

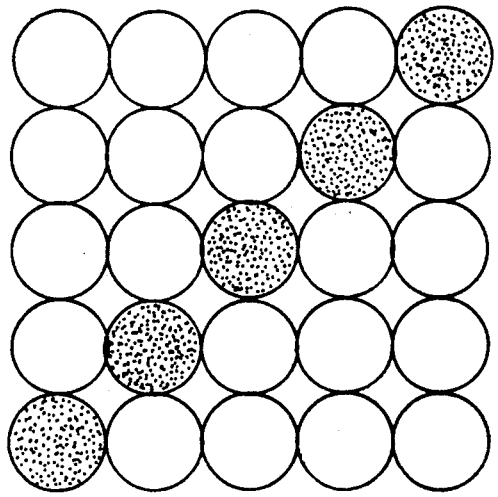
FIG. 9
600 DPI/
BIT MAP
PATTERN
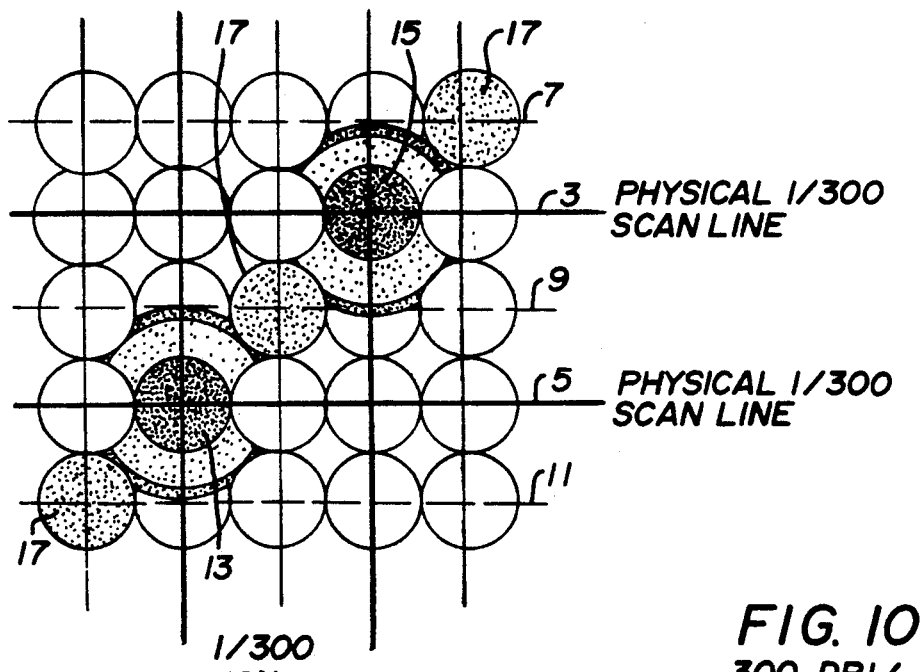
FIG. 10
300 DPI/
600 DPI
CENTERS
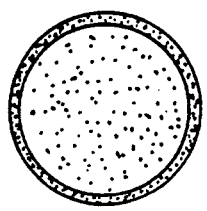   300 DPI DOT
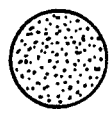   600 DPI DOT

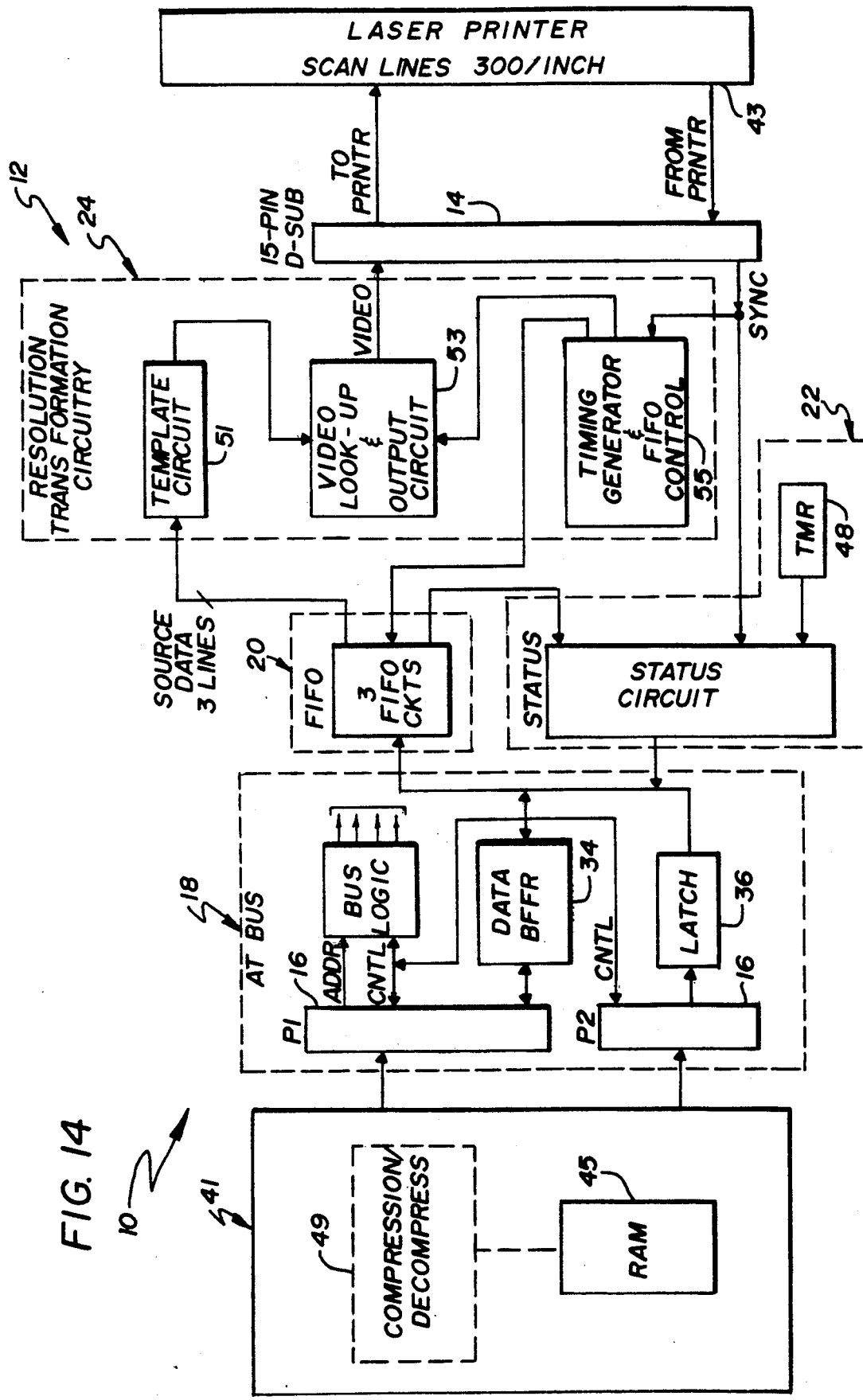

RESOLUTION TRANSFORMING RASTER-BASED IMAGING SYSTEM

RELATED PATENT APPLICATIONS

This patent application is related to U.S. Pat. application Ser. No. 610,094, filed Nov. 7, 1990, concurrently with this case, and entitled "Interleaving Vertical Pixels in Raster-Based Laser Printers", in which the inventors and assignee are the same as in the present application.

FIELD OF THE INVENTION

The present invention relates to techniques for enhancing the output of a display apparatus in general, and more specifically for improving the quality of type, imaging and graphics by modifying the resolution of the output of raster-oriented display apparatus. The output can be made to have either different (higher or lower) resolution than the resolution of the display apparatus, and/or to have the dots aligned along axes other than those of the display apparatus, or to output unaligned dots; the size and/or gray value of dots is also controllable.

BACKGROUND OF THE INVENTION

In some display apparatus, an image is produced by imparting clusters of energy, directly to the display or print medium, or indirectly via some intermediate process.

Some display apparatus, such as the marking engines which are commonly found in non-impact printers and digital copiers, are designed to produce an image on paper or other print material, by placing dots at virtual positions defined by a digital raster; these virtual positions in the raster are known as pixels, short for picture elements. The degree of quantization of the raster is commonly referred to as the resolution; e.g. a printer having a 300 DPI (dot per inch) resolution, produces a raster of dots on 1/300 of an inch centers. Note that in this sense, "resolution" does not refer to how fine a line the printer can produce, and does not refer to the resolving of line pairs.

In some marking engines, such as electrophotographic printers, the image is first produced on a charged surface, such as a photoconductive material, by sequentially scanning the photoconductive material, for example, with a laser beam. As a line is scanned, the laser beam is energized during the extent of each pixel that corresponds to a desired dot in the image. Such marking engines (typically found in laser printers) are known as black writers; engines that energize the beam for white dots, are known as white writers.

When the laser beam is energized, it discharges the portion of the photoconductor upon which the laser energy impinges. The sequential scanning by the laser produces a charge-pattern copy of the desired image on the photoconductor. The printed output is obtained by developing the charge pattern by attracting toner to it, and transferring the developed image to paper, or other print material.

The laser beam is only energized over the extent of a pixel; however, the resulting charge cluster that the beam produces on the photoconductor encompasses neighboring pixels as well. The charge cluster, which is roughly circular or oval in area, is distributed with non-linear, roughly bell-shaped intensity, which is higher at the center of the pixel. In the developing process that produces the output image, only the areas of the photoconductive material with charge above a certain threshold produce an image dot.

The image dots are made to overlap to preclude any of the background from showing through in solid multi-pixel areas, and to reduce the bead-like look of thin angled lines. To produce the overlap, the dot diameter is made to be significantly larger than one pixel; approximately two to three times as large. For example, a 300 DPI laser printer has dot diameters of approximately 1/100 to 1/150 (3/300 to 2/300) of an inch.

To obtain the virtual pixels that determine whether or not to energize the laser beam, the image to be printed is usually first rasterized; i.e. the source data, which is often analog, is quantized into non-overlapping virtual pixels. The pixel raster is also referred to at times as a bit map. In laser beam printers, the pixels (or bit map elements) are usually binary, i.e. represent picture elements that are either black or white; in other display apparatus, multi-bit pixels indicate the size of the dot or its gray value.

In the rasterizing process, graphic elements, such as continuous lines and character outlines are converted to pixel patterns that approximate the source shape. Continuous tone data, such as photographic data, is converted to fixed-size multi-pixel groupings that approximate the average gray value of the corresponding source data; thus, with binary pixels, a 6×6 multipixel grouping can simulate 36 levels of gray, and an 8×8 grouping can simulate 64 levels.

Laser beam printers have potentially continuous resolution along the direction of the laser scan, since the laser can be turned on or off at a relatively arbitrary frequency, to produce the desired resolution. Resolution along the other axis is usually fixed; and determined by the interplay between the paper moving mechanism and the laser scanning speed. This is also true for marking engines such as those based on fixed-head arrays of LEDs or LCDs, where the fixed head array scans down the length of the page. The present invention is also applicable to other marking engines which have fixed resolution in both axes.

Problems with Conventional Approach

In general, the fidelity of the output image to the source data is directly related to the resolution of dots in the output image. Arbitrary analog images cannot be exactly reproduced by a quantized raster; distortions result when the detail in the analog source data exceeds the sampling interval of the quantizing raster.

Distortions are most apparent, at least within the tolerance of the human eye, in continuous tone data, where the printed image appears coarse and grainy, the fine detail is blurred, and much contrast (gray tone) is lost; in text data, where the rhythm is impaired because characters can only be positioned to the nearest pixel; in character shapes, especially in character stemwidths and serifs, since character shapes can only be approximated to the nearest pixel; in lines and edges of characters, which appear jagged (unless the given edge coincides with either of the axes of the raster), since smooth edges can only be approximated with discrete pixel steps.

Even if the source data to be printed is already in digitized form, distortions can result when there is a mismatch between the resolution of the already digitized data and that of the display apparatus; this is true even if the display apparatus has a higher resolution than that of the digitized data.

This mismatch problem is encountered when facsimile data, which is transmitted as digital data with approximately 200 DPI resolution, is printed on a 300 DPI printer. For example, an element that is one pixel thick (1/200 of an inch) in the facsimile data, must be printed (on a 300×300 DPI printer) as either 1/300 thick, which is 33% too thin, or as 2/300 thick, which is 33% too thick.

Existing Enhancement Methods

Various techniques have been developed to improve the quality of the output image. These enhancement techniques include: edge smoothing, fine line broadening, antialiasing (i.e. reducing jaggedness or "aliasing"), and increasing the resolution of the display apparatus.

Most of the enhancing techniques operate on the data after it has already been rasterized, and hence after the fine detail has already been lost, but before it is fed to the display apparatus. The enhancing techniques typically modify the signals to the display apparatus to produce smaller dots that are usually offset from the pixel center, or to produce gray dots.

Print enhancement techniques, such as in U.S. Pat. Nos. 4,437,122 issued to Walsh et al., 4,847,641 issued to Tung and in 4,933,689 issued to Yonkis, produce useful edge smoothing, but they also smooth edges that were meant to be jagged, and can produce extraneous dots and other aberrant results.

The line smoothing techniques, such as in U.S. Pat. Nos. 4,625,222 and 4,544,264 issued to Bassetti et al. produce useful smoothing for certain line types; but they lose fine edge definition for some lines.

U.S. Pat. No. 4,864,326 issued to Kawamura et al. is of interest in disclosing a system in which two laser beams are employed concurrently, but would clearly be unduly complex and expensive for general commercial use.

The above techniques, which are interposed after the source data has already been digitized to a given resolution, do not compensate for the loss of fidelity in continuous tone images, nor for the loss of precision in positioning characters, nor for the loss of shape of characters and other graphic elements.

The various known antialiasing techniques smooth jagged edges by averaging the intensity or gray value of neighboring pixels, using variable-sized dots or gray dots to produce the desired average intensity. Antialiasing produces useful smoothing of the jagged edges, but it has tendency to thicken fine lines and to blur sharp edges.

Increasing the resolution of the output image fundamentally improves the image quality because the rate of sampling of the analog (source) image is increased, thereby retaining finer detail for all the data.

In the past, increasing the resolution of the output image was thought to require increasing the resolution of the display apparatus, as well as requiring an increase in the memory for storing the digital raster data. For example, to increase resolution from 300×300 DPI to 600×600 DPI, such a brute force approach would require a more expensive display apparatus capable of producing 600×600 DPI, and would also require 4 times as much memory to hold the rasterized image data.

Conventional Use of Marking Engines

The conventional uses of marking engines rely on a pair of one-to-one correspondences; between the virtual pixels in the digitized data and the energy clusters that the display apparatus produces; and between said energy clusters and the dots in the output image. Thus, each data pixel determines whether or not a corresponding energy cluster is produced; and in turn, each energy cluster produces a dot on the output image.

The improvements to conventional display apparatus typically interpose circuitry between the digitized raster and the production of energy clusters by the display apparatus. These improvements make use of three approaches to smooth edges: reducing the size of a dot to be smaller than normal; adding additional smaller-than-normal dots along certain edges, positioning a smaller-than-normal dot off-center within the pixel but along the scan line (i.e. to the left or right of the pixel center, for a horizontally scanning laser).

These improvements no longer maintain a one-to-one correspondence between the digitized data and energy clusters. Additional energy clusters are added selectively to produce additional dots that smooth edges, even though the corresponding pixel in the digitized data would not indicate a dot at that position in the image. These added energy clusters, and the resultant dots, are typically smaller than the standard for the display apparatus. But these improvements do preserve the one-to-one correspondence between the placement of energy clusters and dots in the output image. In other words, all energy clusters exceed the threshold required to produce an output dot.

Related Patent Application

In the related patent application noted above, a primitive apparatus for providing some significant enhancement of the output image uses the overlap from the laser beam energy at two vertically aligned pixel points on adjacent scan lines to produce an intermediate or interleaved dot, with the energization being selectively such that no dot is produced at one or both of the two vertically aligned pixel points on the scan lines. However, this primitive system has limitations. For specific example, if a single pixel on an interleaved line is to be actuated, the only opportunities to actuate this pixel are whenever the laser is passing the physical scan lines directly above and below this point, and the only inputs used to determine energization levels are three pixel inputs, namely the bit map values of the two pixels on the scan lines and that of the desired interleaved dot. This limited opportunity of exposure, and limited input does not provide a balance between physical scan line and interleaved scan line dot size, shape and toner coverage. In contrast, this invention provides relatively unlimited opportunity to form an overlap, not merely in using additional pixels to form the overlap but in offsetting a pulse within the pixel, having multiple pulses within a pixel, changing the beam shape, and changing the beam energy level.

SUMMARY OF THE INVENTION

In accordance with one broad aspect of the invention, the resolution of a laser printer having a predetermined number of scan lines per inch corresponding to the normal dots per inch (DPI) of the inter, may be significantly increased by (1) energizing the laser beam at a higher rate, corresponding, for example, to twice the normal DPI of the printer, and (2) providing variable energization of the laser beam at each pixel based on a logic combination of both horizontally and vertically extending digital information representing the desired bit map at and near the pixel point being scanned by the laser beam, including desired bits on interleaved lines between scan lines on each side of the line being scanned by the laser printer; and (3) wherein the sum of the energization from three or more pixel points on the scan lines produces dots at one or more interleaved pixel points, while (4) selectively producing a dot or no dot on the scan line pixel points, depending on energization levels.

In one preferred embodiment of the invention, the energization of the laser beam at each pixel point is determined by a logic circuit, from the digital input from nine bits of a digital bit map centered on the scan point of the laser beam, and including three bits from the current scan line and from interleaved lines above and below the current scan line.

In this preferred embodiment, a single interleaved pixel between two scan lines is evaluated six times and the corresponding dot is formed by the sum of up to six laser pulses at pixel points on adjacent scan lines, with these laser pulses in some cases being of insufficient intensity to produce a dot at the pixel point on the scan line where the center of the pulse is received.

In accordance with a more general aspect of the invention, a single dot may be formed by the sum of a large number of energy pulses from neighboring pixels that can be energized.

The present invention provides a method, applicable to matrix-oriented display apparatus, which can be used to increase or decrease the resolution of the output of the display apparatus, and/or modify the angle of alignment of the output dots along axes other than those of the display apparatus, or to produce an unaligned pattern of output dots.

In contrast to conventional use of display apparatus, the present invention relies on a pair of many-to-one correspondences, for example, between multiple pixels in the digitized data and a given energy cluster; and between the placement of multiple energy clusters and a given dot in the output image. In other words, multiple pixels are used to determine whether and how a given energy cluster is produced; and the multiple energy clusters, individually and as a result of their overlaps, determine where dots are produced on the output image.

The present invention also relies on using energy clusters that are below the output threshold, to create overlapping regions that exceed the output threshold of the display apparatus.

The superposition of energy clusters is additive, with respect to the resultant energy field, and hence with respect to the image produced on the output material. This allows the creation of dots in the output image at positions that do not correspond to the resolution of the display apparatus.

For example, by overlapping four below-threshold energy clusters, a portion of their overlap can be made to have energy that exceeds the output threshold, and hence produces a dot between the four actuatable positions of the display apparatus (such as on the scan lines of a laser printer) but not at the actuatable positions. More complex overlapping effects are naturally possible.

It may be noted that, with this invention, a conventional 300 DPI printer can be used to produce 600×600 or 1200×1200 DPI image output; and to print facsimile data at approximately 200 DPI and to output halftone screens with variable-sized dots at arbitrary angles; and to improve the continuous tone output capability by printing variable-sized or gray dots on an angle, or fixed-size dots at a higher resolution, such as 600×600 or 1200×1200 DPI.

The invention may make use of data compression techniques; of temporary storage to save a portion of the rasterized bit map; and of permanent storage to save patterns (to compare with segments of the bit map) and corresponding driving signals for the display apparatus.

Other objects, features, and advantages of the invention will become apparent from a consideration of the following detailed description and from the accompanying drawings.

BRIEF DESCRIPTION OF THE DRAWINGS

FIG. 6 shows the additive nature of the optical exposure from four overlapping sources;

FIG. 7 shows the optical exposure from a large number of optical exposure sources;

FIG. 8 illustrates an alternative pattern of overlapping exposures for creating a high resolution image;

FIG. 9 is a bit map pattern at 600 dots per inch, as compared with the usual separation of scan lines in conventional laser printers of approximately 300 scan lines per inch;

FIG. 10 is a diagram which is useful in considering the relationship between the scan lines of the usual data printer, and the desired higher resolution thereof;

FIG. 14 is a block diagram showing a preferred circuit for implementing the present illustrative embodiment of the invention;

DETAILED DESCRIPTION OF PREFERRED EMBODIMENT

Before considering the illustrative circuitry implementing the present invention, it is useful to consider certain basic factors which enter into resolution, and improving the resolution of laser printers and other printing apparatus.

Figure 1:
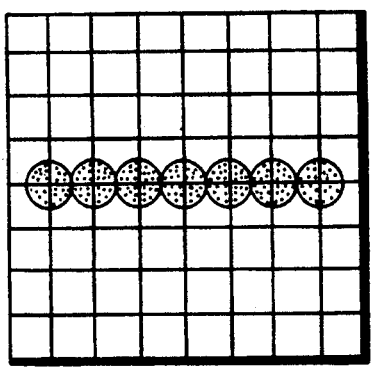
FIGS. 1 and 2 are diagrams useful for discussing resolution and "bit map" information.
Figure 2:
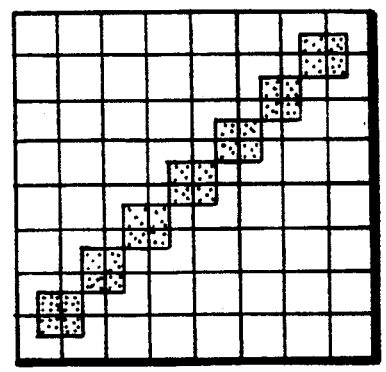

Initially, the most common measure of printer resolution is dots per inch, usually referred to as "DPI" DPI is an indication of the precision with which a printer can produce a dot. Interpreted literally, this would mean the number of individually visible or resolvable dots per inch, which is of course not the case. A 300 DPI printer does not print dots per inch that are 1/300 of an inch in diameter, and for good reason, as discussed below and as shown in the drawings. The purpose of a digital printer is to make the most useful representation of a bit mapped page. As indicated in FIG. 1 of the present drawings, circular dots that are one unit of resolution in diameter cannot make a smooth line. Further, as indicated in FIG. 2, square regions which are one unit of resolution on a side, cannot make a smooth 45 degree line.

Figure 3:
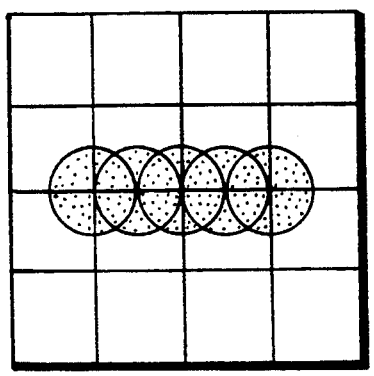
FIGS. 3 and 4 are basic diagrams for discussing spacial resolution and dot size, as used in printers, such as laser printers, for specific example.
Figure 4:
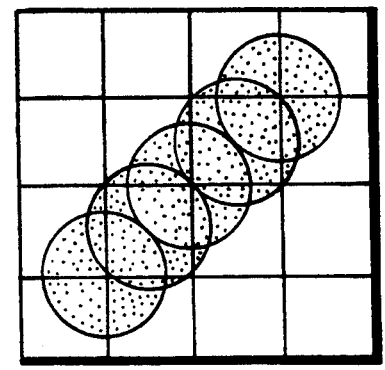

The need to produce solid areas and smooth, horizontal and vertical lines requires a dot size of approximately 2 units of resolution in diameter, as shown in FIG. 3. A smooth line at an angle of 45 degrees is the most difficult, because the nearest points of addressable resolution are spaced apart by distance equal to the square root of 2 times the unit of resolution. This requires dots of approximately 3 units of resolution in diameter in order to produce a smooth line, as shown in FIG. 4. Accordingly, marking engines usually make marks that are between 2 and 3 units of resolution in diameter. For example, a 300 DPI laser printer makes a dot that is almost 1/100 of an inch in diameter, which means that it does print 300 individual dots per inch, but these dots cannot be individually resolved because they overlap. In practice, DPI can be considered to represent the addressable resolution of the dots of a printer.

Figure 5:
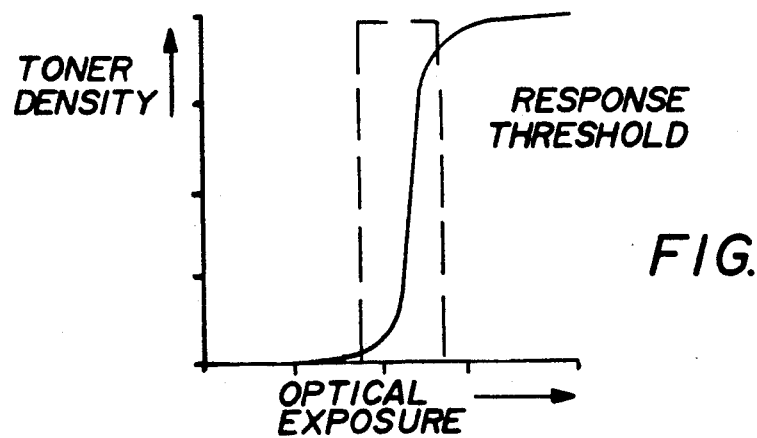
FIG. 5 is a diagram indicating the response threshold of typical laser printers.

Turning now to FIG. 5, the photostatic function of light exposure to toner density is not linear. As shown in the empirically derived diagrammatic showing of FIG. 5, the toner density response to optical exposure is a highly bi-state system. In FIG. 5, optical exposure time is the percentage of time that a moving laser beam is turned on as it sweeps over a given pixel, or picture element.

As indicated by the optical response curve of FIG. 5, the writing beam can be turned on for a substantial period of time without making a mark on the page. Optical exposure greater than the response threshold does not make a significant visible difference.

With these characteristics of the photostatic printing process in mind, theoretically we can make dots of any size at any resolution. A given point may be affected by light from beams centered far from the point. The total optical exposure at a given point is the sum of the light from all overlapping sources. A dot is produced whenever the total optical exposure exceeds the optical response threshold. No dot appears if the total optical exposure is less than the response threshold.

FIGS. 6 and 7 show two examples of these principles. In FIG. 6, four overlapping light sources are shown impinging on the page, and the central area may be energized to a level above the threshold, while the remainder of the page may be substantially free of toner deposition. Similarly, in FIG. 7 a large number of exposures form a single, central dark area, and depending on the level of intensity of the laser beam, and the duration of each pulse, a central spot or broader darkened area may be produced.

Controlling multiple exposure printing is a matter of controlling the total amount of light which strikes a given area. Although the source of light scans along a set of continuous scan lines, for control purposes it can be broken down into a set of evenly spaced zones (pixels) on each scan line. Controlling the amount of time the beam is turned during each of these small zones, controls the amount of light it contributes to each area of effect.

Each light source control point has an effect on multiple destination areas, and each destination area has potential light contributed to it from multiple source control points. Finding the optimum modulation of the light source control points would require the simultaneous solution of a series of inequalities. Each of these inequalities defines the state of a destination area as either less than or greater than the optical response threshold. Alternatively, the series of inequalities may be solved for those areas nearest the current control point by subtracting the contribution of previous control points. In practice, the area surrounding a control point or the pixel currently being scanned by the laser beam of a laser printer, may be examined by a moving "template" or set of points around the current scan position, and a look-up table may be provided which will give the desired energization time, as a logical function of the bits included from the input bit map within the template, and which may include the contribution from previous control points. The look-up table may be implemented by a read-only memory, by hard-wired logic circuitry, or by similar means.

By way of background information, and for completeness, it is noted that in several commercially available laser printers, such as the Hewlett-Packard Laser Jet Printer, the laser beam traverses a normal eight-inch sweep in about 1.28 milliseconds, and provides a synchronization or sync pulse indicating the start of a new sweep every 1.8 milliseconds, allowing about one-half millisecond for retracing. When the laser is energized to provide 600 dots per inch resolution, each bit location may be energized for about 268 nanoseconds (nsecs) or billionths of a second. The threshold level in the Hewlett-Packard Laser Jet is between 134 nsecs and 201 nsecs with energization for 134 nsecs not producing a dot and energization for 201 or more nanoseconds producing a dot. The threshold on other commercial systems may be different. Accordingly, if you wish to place only a single dot at an intermediate pixel location between two of the (300 DPI horizontal) scan lines, you must provide enough energization from pixels on the scan lines so that the overlap at the desired interleaved pixel dot point is above the optical response threshold. The contributing pulses on the scan lines may each have a duration of less than 134 nanoseconds, so that no dots appear at these points on the scan lines, if such is desired. Specifically, four pixels may be energized at relatively low levels on two scan lines at pixel points before and after a desired interleaved pixel dot, in a manner similar to the showing of FIG. 6, to produce the desired single interleaved pixel dot.

The effect of creating charged areas which overlap to provide additional, addressable pixel elements can be produced with a device that has a flat energy cross-section; i.e. where the energy produced is evenly distributed over the area impinged by the energy source. Of more practical importance, this multiple exposure approach can also be used where the device has a nonlinear energy cross-section. For example, in a laser printer, the laser light source is not perfectly linear in its cross-sectional light output; it has a higher intensity about the center of the beam, and a less intense output near the periphery of the beam. The optics within the printer are also not perfect, and tend to diffuse the beam. Finally, the electrostatic action of the photoconductor also reacts differently with differing static charge settings and light exposure levels. Please note that the resolution transforming effect described herein can accommodate these apparent anomalies and still create overlaps that achieve higher resolution output on lower native resolution devices.

The action of writing on the drum with the laser, and precisely controlling the duration of the beam at each physical control point allows those portions of the drum which previously could only be accessed as a "fill" area of surrounding pixels, to now be accessed as an addressable, controllable pixel. Since the pattern written upon the drum for each line is non-volatile, successive passes of laser light (multiple exposures) affect not only areas about the center of the beam, but also areas within the outer periphery of the beam. To utilize this effect, a controller is used which "views" adjacent horizontal, vertical, and diagonal pixels within the source bit map, and appropriately modulates the laser beam for this control point.

The selection of the beam duration, shape, and intensity that is used allows the system to compensate for the aforementioned non-linearities, and allows a "look-up" table based upon a "template view" of the source bit map. This source bit map to modulation output transformation has been implemented (varying only the beam duration) to provide near perfect quadruple resolution; and higher output resolutions are possible.

FIG. 8 is an illustrative modulation arrangement for producing a high resolution image in which pulses from three different physical scan lines may be employed to produce a dot which is relatively close to one of the scan lines. This effect is indicated by the darkened central area shown in FIG. 8.

FIG. 9 shows a bit map at a 600 DPI resolution level, for use with a laser printer having scan lines located 1/300 of an inch apart. Such a laser printer conventionally has a 300 DPI output resolution; and as discussed hereinbelow, though the system disclosed herein and illustrating the principles of the invention, can be made to have a resolution of 600 DPI.

The diagram of FIG. 10 indicates two physical scan lines 3 and 5 of a conventional laser printer, which are spaced apart by 1/300 of an inch. In order to produce an image at 600 DPI, it would be desirable to locate additional dots in the image along intermediate or interleaved lines 7, 9 and 11. There is, of course, no problem in locating the dots 13 and 15 as they are on the physical scan lines 3 and 5. Further, there is no problem with energizing the laser beam at the higher 600 DPI rate, as it travels along the scan lines, as compared with the usual 300 DPI rate of the conventional scanner. Further, to provide output dots at the points 17, three or more adjacent or nearby pixels on the scan line are preferably energized at appropriate levels so that overlapping energy clusters provide output dots at these points. As mentioned above, these dots may have a diameter equal to two to three times the resolution level, so as to provide a continuous line, as shown in FIG. 4, for example. For a resolution of 600 DPI, the dots may have a diameter of between 2/600 or 1/300 of an inch, and 3/600 or 1/200 of an inch.

Figure 11:
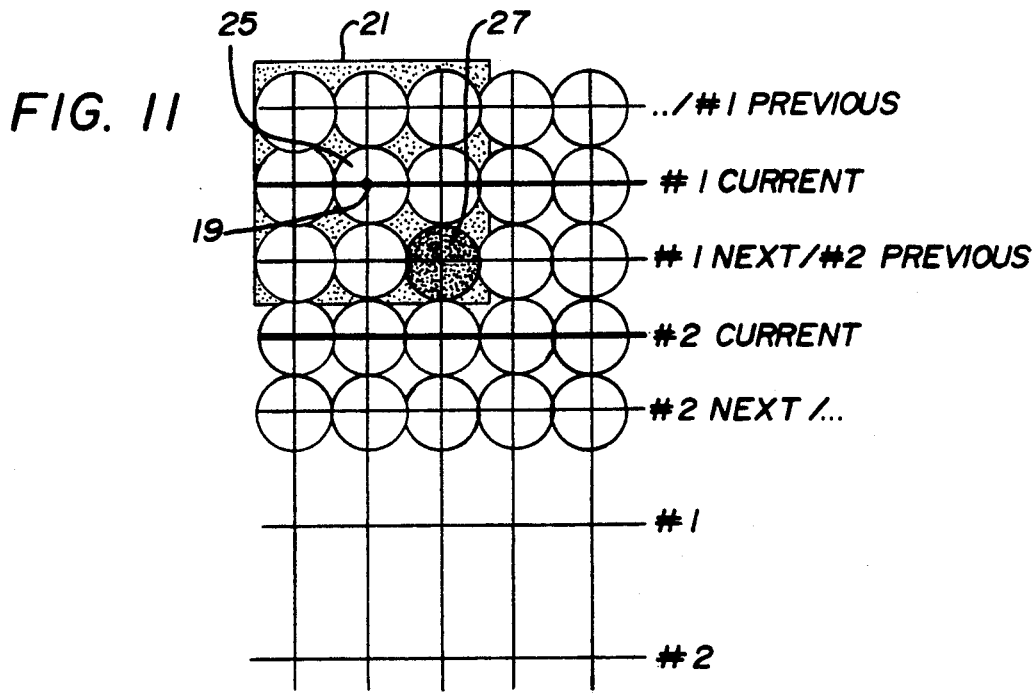
FIGS. 11 and 12 show bit maps and associated "templates" or sets of bits which are considered in a preferred embodiment to determine the appropriate energization level for a laser beam.
Figure 12:
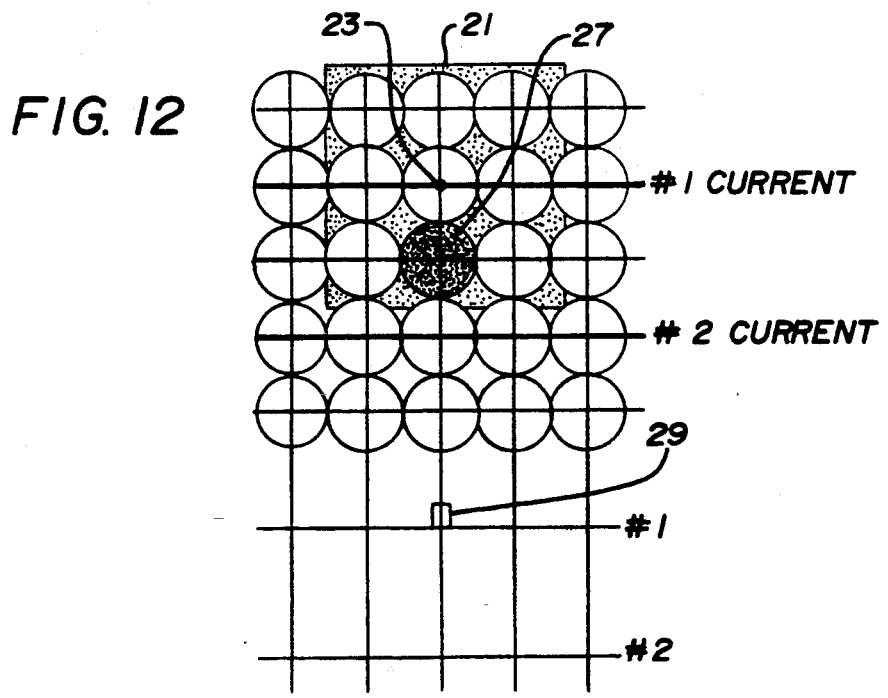
Figure 13:
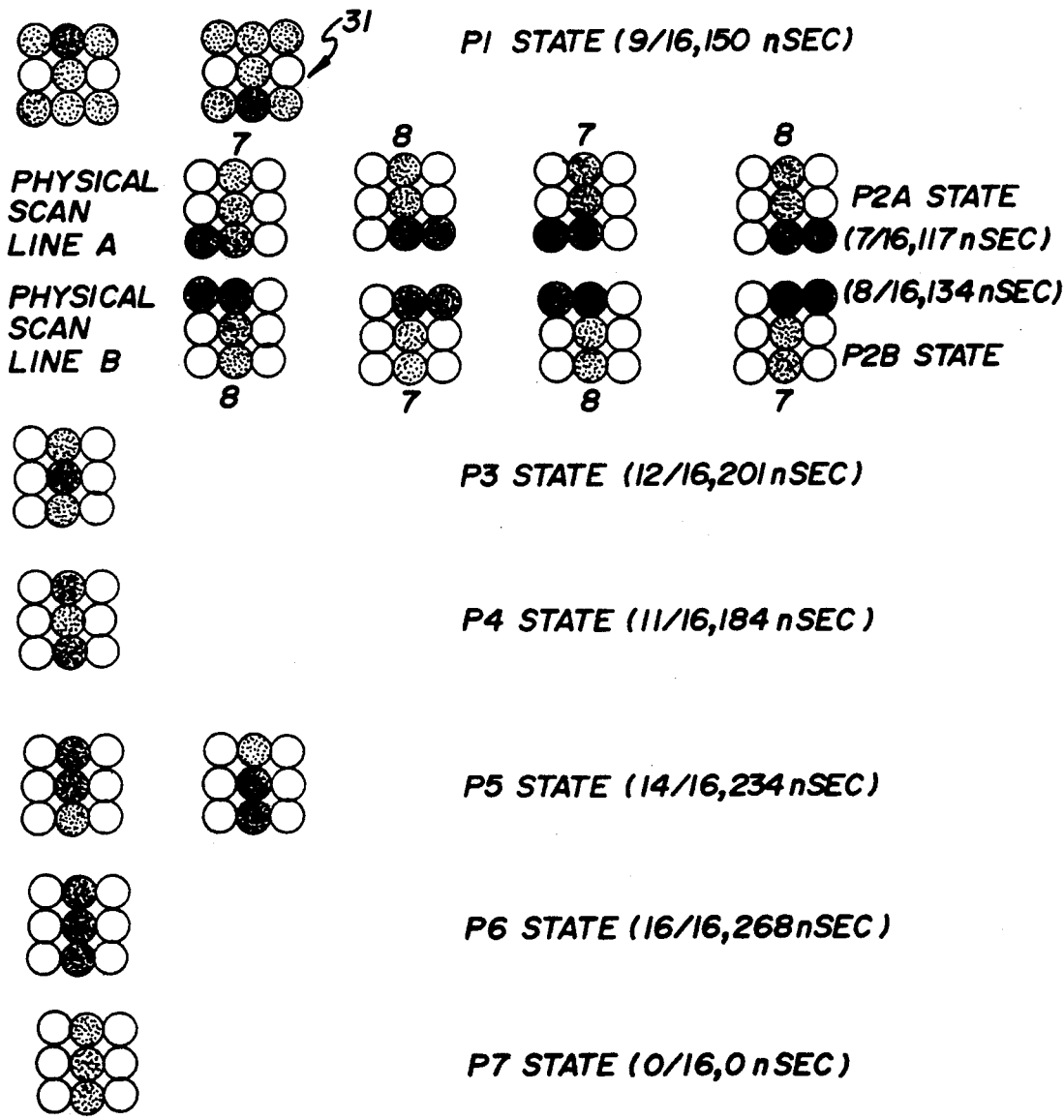
FIG. 13 shows the various possible bit map inputs, each including 9 bits, and the corresponding time of energization of the laser beam.

The specific implementation of the present illustrative embodiment of the invention will now be considered from a functional standpoint in connection with FIGS. 11 through 13 of the drawings. In FIG. 11, the laser beam of the laser printer is assumed to be at a point corresponding to point 19, and the energization level or duration at that point is determined by all of the nine bits of the bit map included within the "template" 21 shown as a square shaded area, and with point 19 at its center. In contrast, the showing of FIG. 12 involves the laser beam at the point 23, the next point along the scan line, with the template 21 having been shifted to consider the next successive group of nine bits of the bit map included within the template 21 and immediately surrounding the point 23. As indicated by the pulse 29, under the circumstances shown in FIG. 12, with only the single bit 27 indicating an output, a pulse will be provided with the laser beam at the scan point corresponding to the point 23. Similarly, the absence of a pulse at the area 25 of FIG. 11 indicates that the laser beam at point 19 would not be energized, when the template only includes a single intended output dot at a point below and to the right of the scan point.

A more complete table of laser beam energization times versus template patterns is set forth in FIG. 13. Thus, for specific example, note that the bit map input as shown at reference numeral 31 conforms to that depicted in FIG. 12, and indicates an output energization for 150 nanoseconds of the possible 268 nanoseconds available for energization during a particular pixel interval.

FIG. 13 shows the possible combinations of template conditions logically used, and the modulation values for each. The particular modulation value used provides a good match between physical and interleaved dots and lines.

To provide a more complete explanation of the operation of this template in FIG. 13, each state will be individually discussed.

P1 State covers the condition of a single interleaved dot. The first view is when the dot is observed from the scan line below the dot, the second view is when the dot is observed from the scan line above the dot.

P2 State is the most complicated state created. The P2 state detects a single interleaved line. This state uses two different pulse widths, depending on which dot position is evaluated, and which scan line is evaluating the dot position. The two rows of templates shown in FIG. 13 show two successive physical scan line views of an interleaved line. At the first and third position of Scan Line A, a 7/16 pulse is used; at the second and fourth position, an 8/16 pulse is used. At the first and third position of Scan Line B, a 8/16 pulse is used; at the second and fourth position, an 7/16 pulse is used. This alternating pulse pattern provides a balanced line width and line density.

P3 State is used to create a single physical scan line.

P4 State is used to create a two interleaved scan lines on either side of a physical scan line.

P5 State is used to create two scan lines, one physical and one interleaved, directly adjoining each other.

P6 State is used to create three scan lines, one physical and two interleaved, directly adjoining each other.

P7 State is used to create an area void of any lines (white area).

To briefly summarize, pixel dots may be located approximately half way between two horizontal scan lines by energizing up to six adjacent pixels on scan lines so that the sum of the energy applied to the intermediate pixel point is above the threshold level. It is important to note that this embodiment provides multiple exposure opportunities for interleaved pixel points. By way of example, the three by three template structure shown in FIG. 11, 12, and 13 shows that there are six potential actuation times for interleaved pixels, and three actuation times for physical pixels. With various combinations of desired output of pixel points on and between the horizontal scan lines, various levels of energization of the pixel points along the scan lines are appropriate; and the required energization levels are included in the "Modulation Table" of FIG. 13. It is noted in passing that the Modulation Table of FIG. 13 is intended for use with the Hewlett Packard Laser Jet printer, and that the different properties of other printers could involve other comparable but different arrangements for providing increased resolution.

FIG. 14 is an electrical block diagram of a preferred apparatus 10 for controlling a laser printer or other image creation device to accomplish the results set forth above. Apparatus 10 is preferably interposed between a source of image data such as an IBM AT personal computer 41 and laser printer 43, such as a Hewlett Packard Laser Jet. Apparatus 10 includes control circuit 12, output connector 14 for operably coupling with the printer 43 for providing modulation signals thereto, and input connector 16 for printer coupling with the PC for receiving image data therefrom.

Control circuit 12 includes PC interface circuit 18, FIFO (first in, first out) circuitry 20, status circuit 22, and video generation circuit 24. In general, address information and image data are received by interface circuit 18 which controls the flow of image data to FIFO circuit 20. Circuit 20 in turn feeds three lines of data at a time to resolution transformation circuit 24 which creates the modulation signals for controlling energization of the laser included in the laser printer 13. Status circuit 22 ensures synchrony in the data flow between the PC 41 and the printer 43.

It may be noted, generally speaking, the block diagram of FIG. 14 could describe any number of serializing video generator systems. The electrical circuitry required to present data to a serialized output device is similar in design and implementation. This embodiment's ability to achieve the resolution transformation is not dependent upon the particular device or interface providing the source data. The resolution transformation occurs within the block labeled "Resolution Transformation Circuit" of FIG. 14.

The host computer 41, which includes a random access memory (RAM) 45, having enough storage to hold a 600×600 DPI bit map of the sheet to be printed. The laser printer 43 may be of a conventional type having 300 horizontal scan lines per inch. The FIFO (first-in, first-out) circuitry 20 store lines of image bit information from the 600×600 bit map stored in random access memory 45. Specifically, the FIFO circuitry 20 stores the 600 DPI bit map information for the current scan line and adjacent interleaved lines (and scan lines, if appropriate) of the laser printer.

The resolution transformation circuit 24 receives three lines of data from FIFO circuitry 20 and operates successively on sets of nine pixel bits, from the 600 by 600 bit map, with the central pixel bits being on one of the physical horizontal scan lines, and the other two sets of three pixels being the interleaved pixels immediately above and below this central set of three pixel bits, and not on the physical horizontal scan lines of the laser printer. The output from the resolution transformation circuit is a series of pulse width modulated pulses, having durations as indicated in the Modulation Table set forth in FIG. 13, with one pulse per pixel time interval (approximately 268 nanoseconds).

The host computer 41 may also include optional compression/decompression circuitry 49 for reducing the amount of storage required of the RAM 45. The circuitry 49 may be conventional in nature and utilize the fact that scan lines often include substantial or extended white and then substantial black zones, and these can be represented by a binary number indicating the number of pixels in the scan line of the bit map where there is no change from black to white, or vice versa, thereby avoiding the need to make an entry in the RAM for each pixel. This type of "run-length" compression and decompression circuitry is known per se.

The resolution transformation circuitry 24 may include the "template" circuit 51, the video "look-up" and output circuit 53, and the timing generator and FIFO control circuit 55. The functions of these circuits are as indicated by the circuit connections of FIG. 14 and as indicated in greater detail in connection with FIGS. 15A, 15B, and 15C.

Figure 15A:
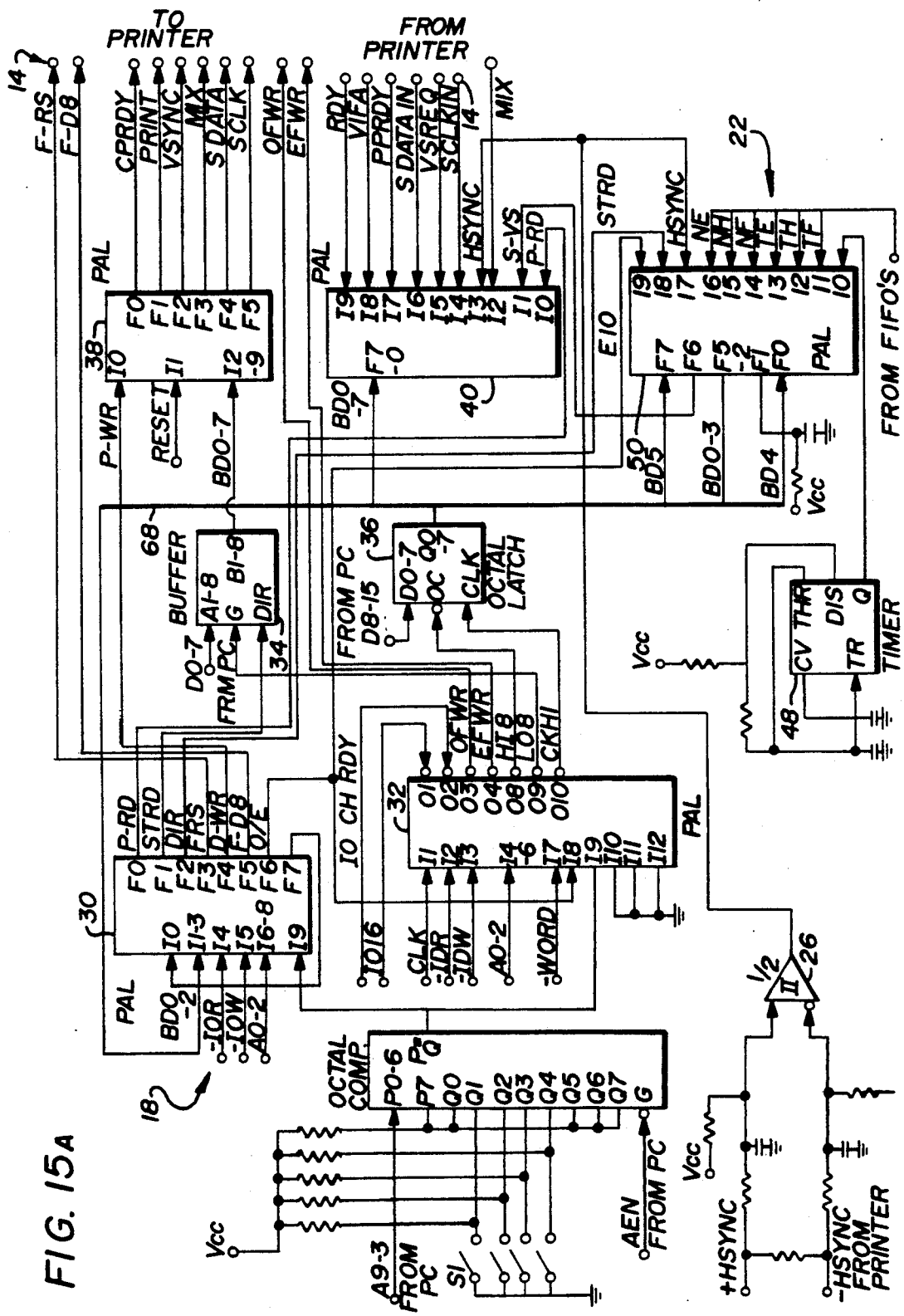
FIGS. 15a, 15b, and 15c are detailed circuit diagrams showing how the block circuit diagram of FIG. 14 may be implemented.
Figure 15B:
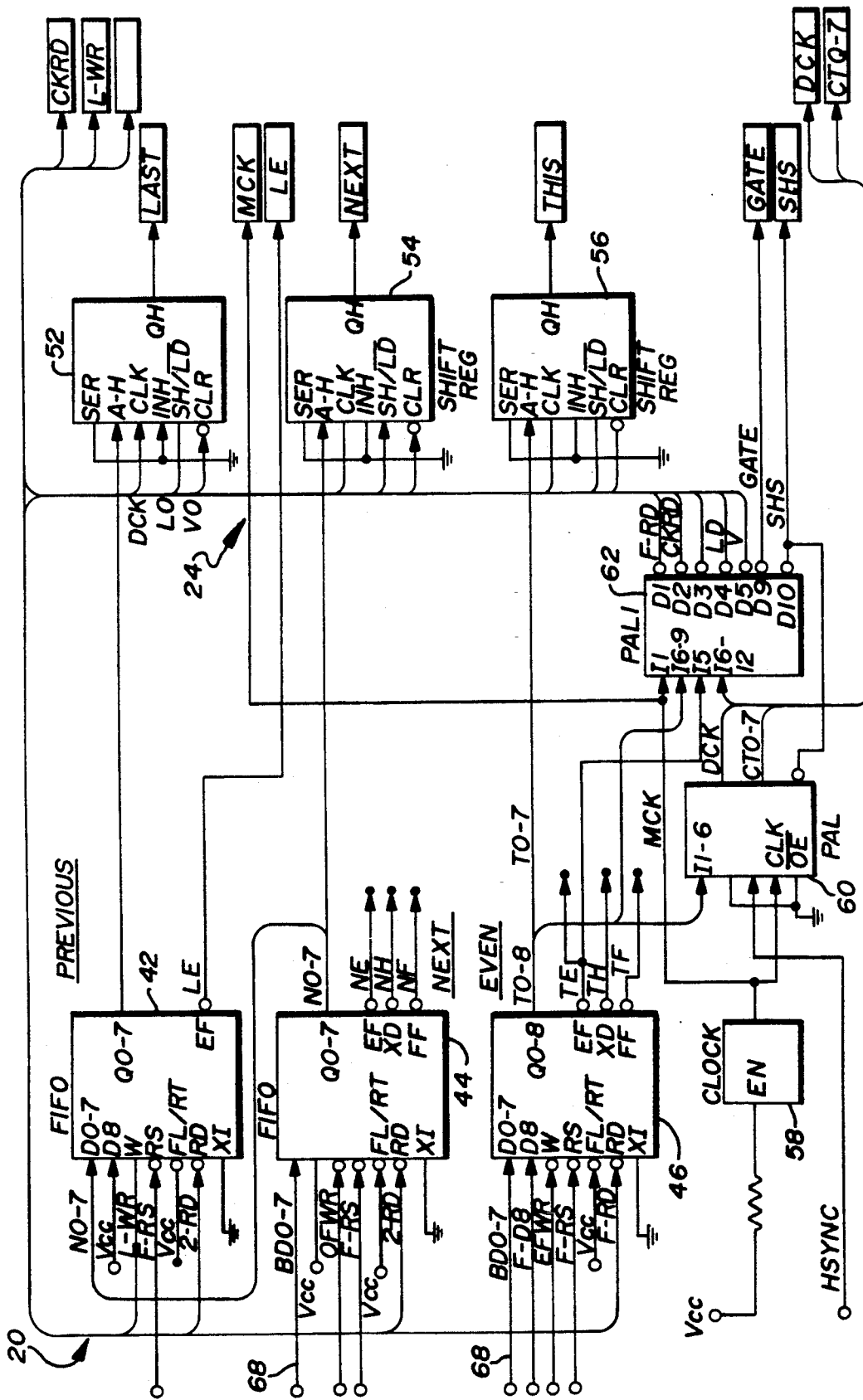
Figure 15C:
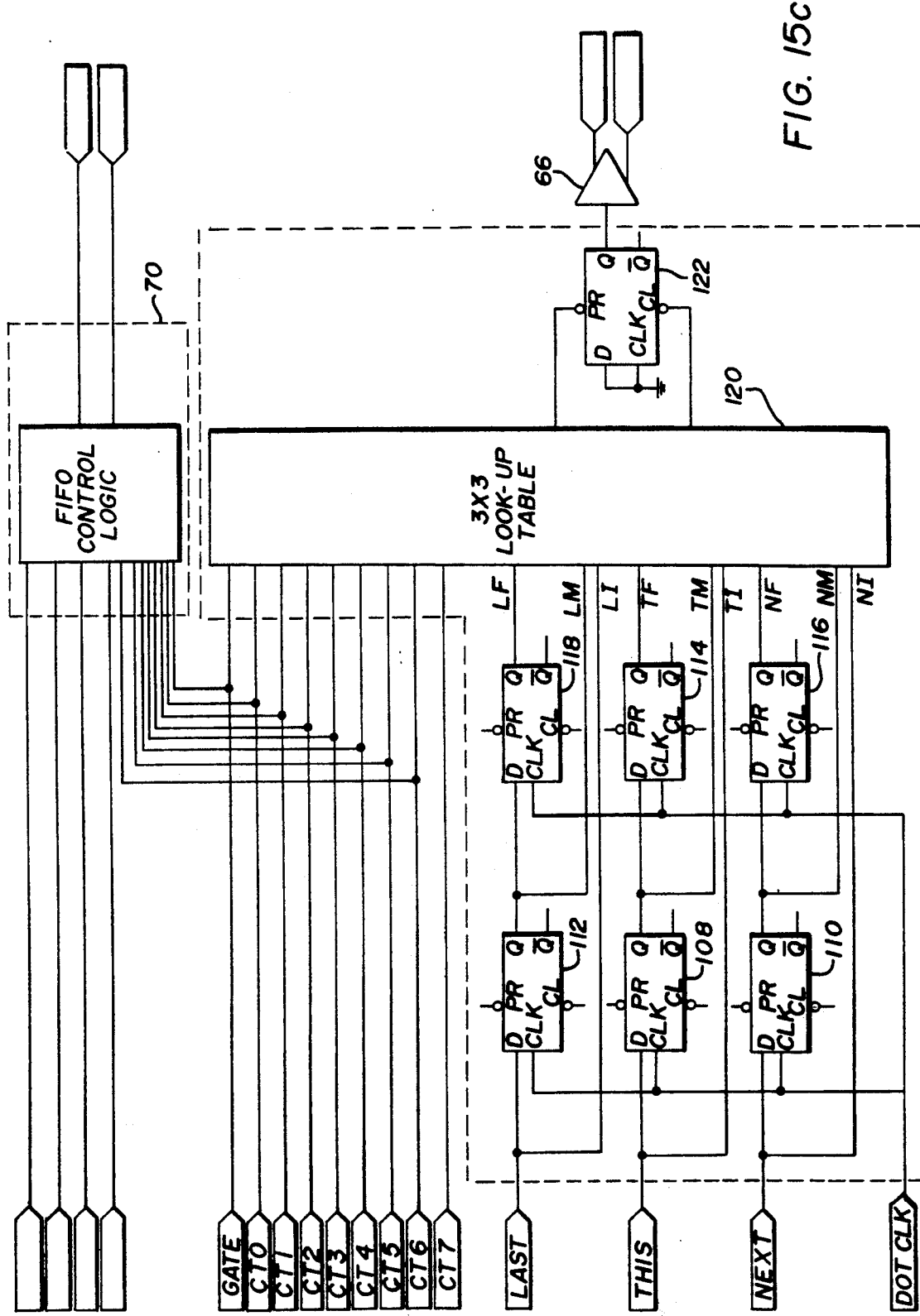

FIGS. 15A, 15B, and 15C are electrical schematic diagrams of the components and interconnections of elements 14–24 of FIG. 14. In particular, interface circuit 18 shown in FIG. 15A includes input transceiver 26 (one-half of receiving and transmitting differential driver, model 75179), address selection switch S1, octal comparator 28 (74ALS688), bus controller 30 (programmable array logic 16L8), bus controller 32 (programmable array logic 22V10), bi-directional buffer 34 (74LS245), octal latch 36 (74LS373), printer data output device 38 (programmable array logic 18CV8) and printer data input device 40 (programmable array logic 16L8) all connected as shown. Switch S1 is a four unit switch used to set the base address on octal comparator 28 for comparison with the address received thereby from the PC 41 to which apparatus 10 is connected, as shown in the blocked diagram of FIG. 14. Data output device 38 is connected to the printer by way of the lines shown for transferring commands and data therebetween. Data input device 40 is also connected to the printer by way of the lines shown for monitoring printer status.

The PC presents image data as a two-byte word composed of respective low and high bytes. Buffer 34 receives eight bits of low byte data (D0–7) from the PC at terminals A1–8 and is also used to present data over lines D0–7 to the PC for reading printer status, FIFO status, and timing signals for error detection. Latch 36 receives eight bits of high byte data (D8–15) at terminals D0–7 thereof from the PC.

FIFO (first-in, first-out) circuit 20 shown in FIG. 15B includes previous odd line FIFO 42 (MK4503), next odd line FIFO 44 (MK4503) and even line FIFO 46 (MK4503) each having the capability of storing a little over three lines of printer line data (2048 bytes). Incidentally, as used from time to time in this specification, the normal scan lines of the laser printer will be referenced as "even lines" or "nominal lines", or "physical lines", while the interleaved or intermediate lines will also be referenced as "odd lines". These FIFO circuits 42, 44 and 40 receive and store the image data from the PC corresponding to three horizontal image lines and serves as a data buffer for asynchronous data transfer from the PC to the printer. The FIFO circuits normally include random access memory and associated logic circuitry.

Status circuit 22 includes timer 48 (LM555C), see FIG. 15A, and FIFO status read device 50 (programmable array logic 16L8). This circuit allows the PC to monitor the empty, half-full and full status of FIFO's 44 and 46 in order to determine whether additional data is needed, and to determine whether excessive printer operation delays have occurred which may be indicative of an error condition. Video generation circuit 24 includes shift registers 52, 54, and 56 (each 74F166), clock 58, video timing controller 60 (programmable array logic 16R8), timing decoder 62 (programmable array logic 22V10), output modulator 64 (programmable array logic 22V10), and modular output transceiver 66 (the other half of transceiver 26, model 75179).

In operation, the base address, as set by switch S1 and received from the PC by octal comparator 28 over address lines A3-9, is used in combination with additional address bits A0-2 and input/output or I/O read (RD) and write (WR) inputs received by bus controller 30. The I/O map for these inputs from the PC are shown as follows:

| IO MAP | RD | | WR | |
|---|---|---|---|---|
| Base + 0 (B0) | FIFO reset | (F RS) | Odd/even (O/E) | |
| Base + 1 (B1) | Printer status | (P RD) | Printer control (P WR) | |
| Base + 2 (B2) | FIFO status | (ST RD) | End of line (1) (F D8) | |
| Base + 3 (B3) | FIFO status | (ST RD) | Not end of line (0) (F D8) | |
| Base + 4 (B4) | FIFO status | (ST RD) | Word: low byte/high byte (LO 8) | |
| BaSe + 6 (B6) | FIFO status | (ST RD) | Word: hi/lo byte | |

The combination of high address bits from address lines A0-2 and the read/write inputs are decoded by bus controllers 30 and 32 in order to activate the output lines therefrom for controlling the other devices. Initially, an input from the PC of base +0(B0) in combination with I/O read (B0/RD) activates line F RS which resets FIFO's 44-46. Next, input B0/WR initially activates controller 30 line O/E to select even FIFO 46 for data transfer thereto.

Signal B4/WR then enables even FIFO 46 to receive data over data bus 68 from the PC by way of buffer 34 and latch 36. That is to say, the data received from the PC is 16 bit parallel data but is transferred over data bus 68 by transferring the low eight bits and then the high eight bits. Bus controller 32 controls this sequence in accordance with the inputs from the PC by activating output line L0 8 to buffer 34. Of the data sent to FIFO 46, the high-order two bits of the first byte of each even line of data determines whether the modulation output is to be in terms of 300×300 DPI, 300×600 DPI, or 600×600 DPI. Most PC's through their operating programs, allow the user to designate the type of printer which is connected for output which also designates the format for the output data including the proper bit map for the resolution of the designated printer. Many commercially available word processing programs, for example, are capable of providing output image data bit mapped for 600×600 DPI.

The low-order six bits of the even line data's first bytes are counter data used by video timing controller 60 which is explained further hereinbelow. The next twenty bytes (approximate) are all zeroes (white data) because the typical printer does not print on the first 160-180 pixels in order to provide a left margin. Next, 600 bytes of data are transferred corresponding to eight inches of line data, assuming the 600 DPI mode has been selected.

During start-up, the FIFO's need to be initially filled or primed with data corresponding to three image lines. The data corresponds to even and odd numbered lines of information The even line data is transferred to even line FIFO 46. The odd line data corresponding to the next line of data is transmitted to odd line FIFO 44. This odd numbered line data will become the previous line of data when the next line of even numbered data is transmitted to FIFO 46. Accordingly, the odd-line data transmitted to FIFO 44 is subsequently transferred to previous line FIFO 42. Thus, after the FIFO's have initially received data on start-up, the line data therein respectively corresponds to three lines of information—an even line in FIFO 46, the next line (odd numbered) in FIFO 44 and the previous line (also odd numbered) in FIFO 42.

In order to initially "prime" the FIFO's with data, address B2/RD allows the PC to read full/empty status of the selected FIFO to ensure that it is not full. Next, an even numbered line of data is transmitted to even FIFO 46. At the end of the line, address B2/WR sets FIFO bit D8 active indicating the end of a line of text. Next, address B0/WR enables odd FIFO 44 and the data transmission process is then repeated to transfer the next line of data to odd FIFO 44. This data transmission process continues to toggle between FIFO's 44 and 46 with lines of data until the FIFO's become half full. At this point, the PC checks the empty/full status of the FIFO's after each byte of data to ensure that data is not transmitted which would exceed the capacity of the respective FIFO's.

In the event of a FIFO status indication of "full," the PC waits until it reads "not full" before transmitting additional data. A horizontal sync signal is produced by the printer at the end of each line of print and is received therefrom by input transceiver 26 which buffers the signal and transfers it to devices 50 and 40 and also to video timing controller 60. The reading of data from the FIFO's is initiated by the horizontal sync signal.

FIFO status read device 50 included in status circuit 22 receives the empty/full status information from FIFO's 44-46 and presents this information on data bus 68. The horizontal sync information is translated by device 50 into a vertical sync signal which is also presented to bus 68. Timer 48 functions as a "watchdog" and presents 1/10th second pulses to device 50 which are read by the PC. If the vertical sync signal is not received within ten seconds, an error condition with the printer is indicated and the PC waits until the error is corrected. This might occur if the printer runs out of paper, for example.

Resolution transformation circuit 24 functions somewhat independently from interface circuit 18 by pulling data from FIFO's 42-46 at the same time interface circuit 18 is keeping FIFO's 44-46 supplied with data. In general, resolution transformation circuit 24 receives parallel data from FIFO's 42-46 into shift registers 52-56 respectively which convert the data into serial format. In other words, the output from FIFO's 42-46 is asynchronous with the input. This allows the PC and printer to communicate at different operating speeds. The horizontal sync signal provides the necessary coordination.

The serialized data from shift registers 52-56 are received bit by bit into logic and video modulator circuit 64 which transforms corresponding sets or templates of bits of data into pulse width modulation signals supplied to the printer by way of output transceiver 66. The modulated output is developed in accordance with the table of FIG. 13 for the nine bit template employed in the presently preferred implementation of the invention. Logic and modulation circuit 64 includes the circuitry for providing nine bits for logic processing from input bits on the current scan line and from interleaved lines immediately above and below the current scan line. The sequence of operation is controlled by clock 58, controller 60, decoder 62, and FIFO logic 20 in accordance with the timing information received in the first byte of each even numbered line of image data received by even FIFO 46.

After receiving the first line of data, horizontal sync activates, and the first timing control byte is read from FIFO 46. This byte establishes the format for the subsequent reading for this line of data.

Upon receipt of the first count, FIFO logic 70 provides a read output (RD 2) to previous line FIFO 42 which activates this FIFO to transmit its data as output to shift register 52 substantially simultaneously with the data output from FIFO's 44 and 46 to shift registers 54 and 56 respectively. On start-up, the first line of data from previous line FIFO 42 is undefined because no data has been yet transferred from next FIFO 44. The first line of data is not printed by the printer, however, so the first line of ambiguous data from FIFO 42 is of no consequence. Shift registers 52-56 then convert the parallel input data to serial outputs, one bit at a time, at the respective QH output points. The QH outputs are received at terminals I6 through I8, respectively of modulator 64. Modulator 64 then converts each set of three input bits to the modulation signal provided to the printer by way of output transceiver 66.

FIG. 15C shows diagrammatically the circuits contained within modulator 64 and FIFO control 70 components. The modulator 64 contains the modulation look-up table, template bit storage and video output logic. Modulator 64 has inputs CT0-CT7 which are used as look-up table timing inputs for pulse width creation. These inputs are generated within video timing controller 60, and are state clock phases of the MCK master clock signal. The resolution of sixteen times the frequency of DCK is achieved utilizing these inputs, providing timing resolutions of approximately 17 nanoseconds per interval.

Reference will now be made to the bit map inputs 102, 104, and 106 to the flip flop circuits 108, 110, and 112 making up the first set, and to the flip flops 114, 116, and 118 making up the second set at the input to the look-up table circuitry 120. "Last", "next" and "this" inputs 106, 104 and 102, respectively, are the serialized output from shift registers 52-56. These inputs represent the source bit map data, and are passed through a series of flip-flop circuits to provide the "template view" of each respective scan line's bit pattern. The output from each flip-flop, along with the original "last", "next" and "this" inputs provide the template data to be evaluated during each DCK, or dot clock interval (268 nsec).

The Gate signal is utilized as a master control of vertical resolution mode. If the gate signal is low, the output is 300 DPI vertically. If the gate signal is high, the output is 600 DPI vertically.

The state inputs, the nine template inputs, and gate signals are continuously acted upon by the look-up table logic section circuitry 120 to determine the appropriate modulation pattern to use for each pixel interval. The modulation pulse width is as described in FIG. 13. This pulse output is made by setting output flip-flop 122 within modulator 64 at the start of the desired interval, and resetting this output flip-flop and the end of the interval. The signal is sent to the laser printer through driver 66.

The clock input line designated "dot clock" is coupled to the six flip-flops, and advances the data in synchronism with the movement of the scanning laser beam.

Figure 16:
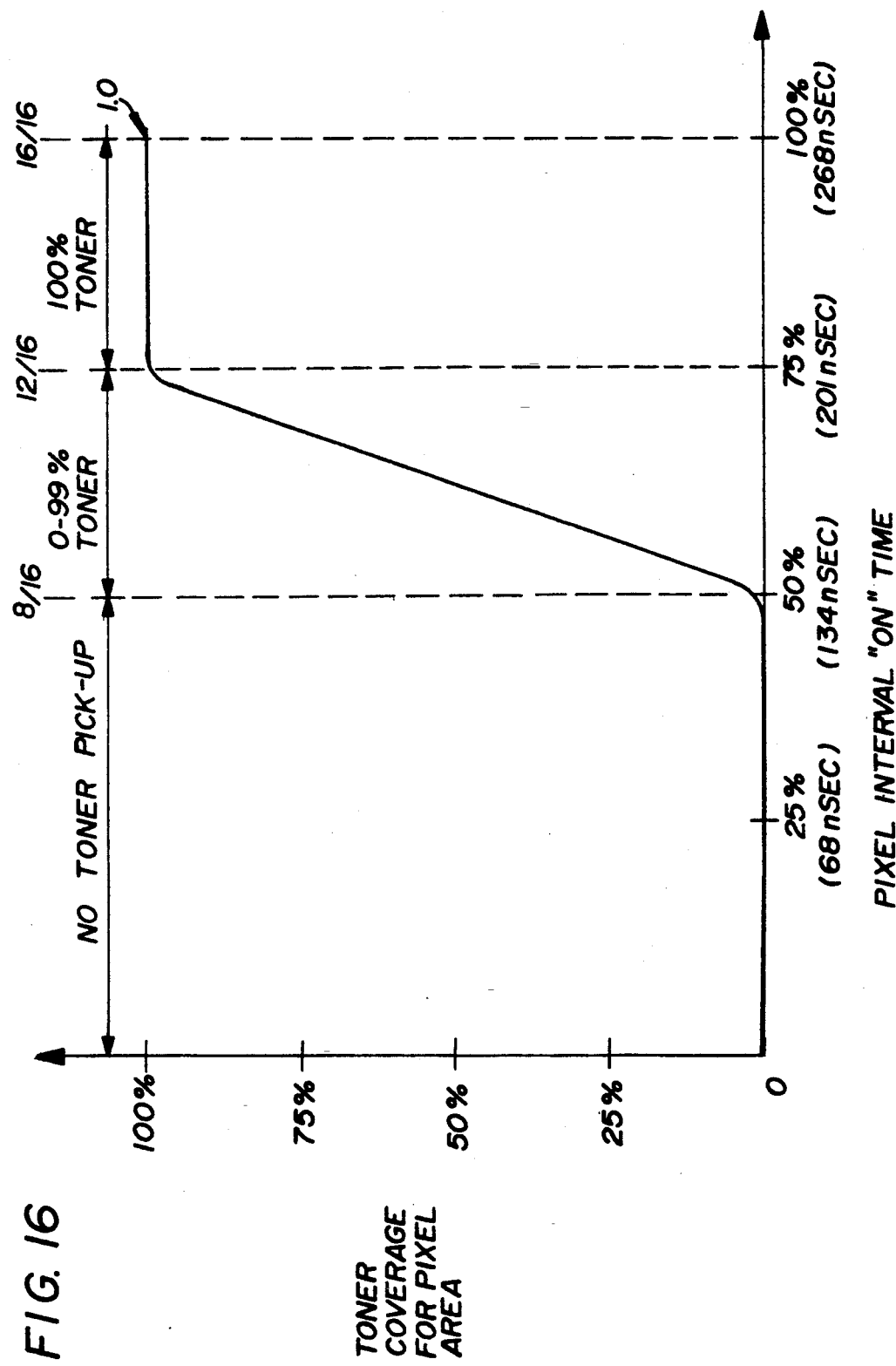
FIG. 16 is a more detailed plot of the toner density versus the energization time of the laser printer.

Referring now to FIG. 16, this is a more accurate indication of the toner density covered versus the pulse time on successive 600 DPI pixels. As discussed hereinabove, the total time period for each pixel is approximately 268 nanoseconds. This corresponds to full energization of the laser beam during the entire pixel period. This point on the plot of FIG. 16 is indicated by the designation "1.0", while lesser levels of energization for shorter periods of time are indicated by the fractions along the plot line of FIG. 16.

Figure 17:
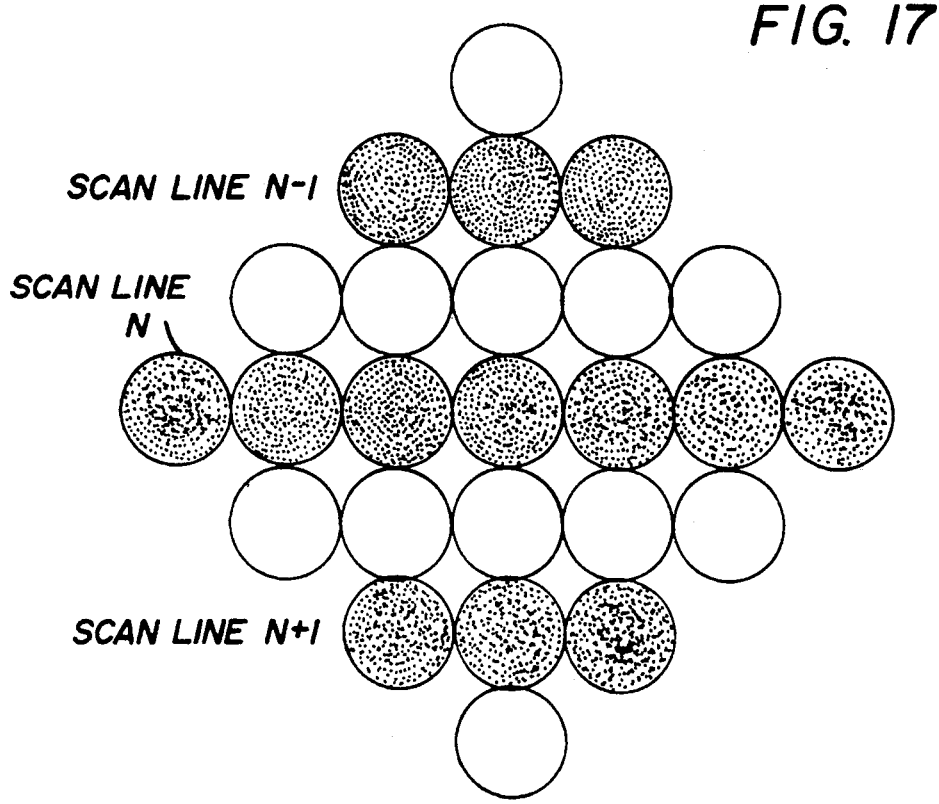
FIG. 17 is an example of a 25 pixel template for determining actuation of the central pixel.

FIG. 17 represents a 25 pixel template, which has as inputs the data from the 25 pixels of the bit map corresponding to the template shown in FIG. 17. In FIG. 17, the central black colored pixel represents the selected location, such as the current position of the laser beam.

In this example, all circles are positions for potential output dots. The gray circles correspond to physical scan lines, the white circles correspond to interleaved lines between scan lines; the gray and black circles correspond to positions at which the device is being actuated. The resultant energy at the black circle (which determines whether or not an actual dot is produced at that position) is the energy that is contributed by actuating the energy source at that position (the black circle) plus the energy that is contributed from the actuation of the energy source at all of the gray circle positions.

In this example, the 25 circles correspond to the template (for the black circle); i.e. the data from the 25 bit map data pixels (that correspond to the 25 circles) is used to determine how the energy source is actuated at the black circle.

Figure 18:
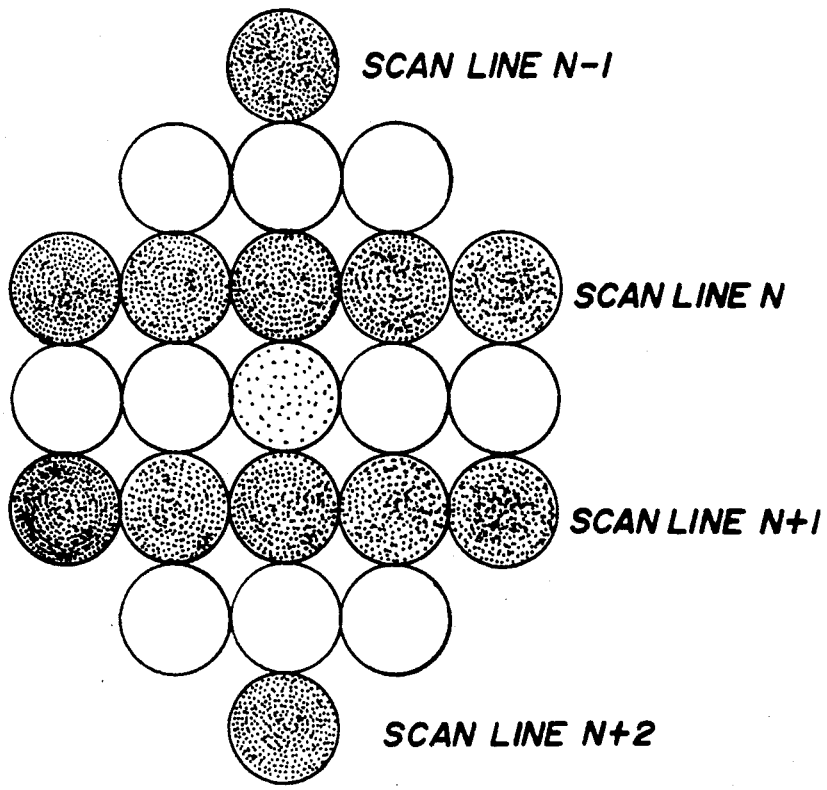
FIG. 18 is a diagrammatic showing of an intermediate pixel, and the nearby scan line pixels which contribute to its energization.

In this example of FIG. 18, the patterned central circle corresponds to an interleaved position (and cannot be actuated); the template from FIG. 17 is used to determine the actuation of each of the gray circles, which are on physical scan lines. The white or open circles correspond to interleaved positions. The resultant energy at the patterned circle is the sum of the energy that is contributed from the actuation of the energy source at all of the gray circle positions. In the case of a scanning laser beam printer, the gray circles correspond to pixel locations at which the laser beam may be actuated to produce the energy overlap at the central patterned circle.

It is also noted that the present invention is applicable to the reduction of resolution, as well as to increasing resolution. Thus, by way of example, if a 200 DPI FAX is copied on a 300 DPI laser printer, the resultant image could have some serious defects, as a line one pixel wide would have to be reproduced with either a single pixel width or a double pixel width at 300 DPI. Using the present system, however, the 200 DPI would be faithfully reproduced. Concerning other ramifications, the present invention is applicable to copiers, in which the input bit map is obtained from the copier scanning arrangements; to printers involving multiple bit representations for each pixel for representing color, various gray levels or the like; to systems in which the laser actuating signals are stored with pixel location information for a period of time before the image is created; and to systems in which the image-producing arrangement include a cathode ray tube (CRT) or film exposure by a light beam.

Incidentally, where the designation "template" is used in the present specification and claims, it is intended to cover all arrangements whereby the contributions from all relevant (normally nearby) pixels are considered, and their contributions evaluated. In some cases this could involve directly solving simultaneous equations in real time. For practical, real-time evaluation in certain cases, it may be preferable to limit considerations to a specific set of nearby pixels.

In conclusion, it is to be understood that the foregoing detailed description and the accompanying drawings relate to one preferred embodiment of the invention. Various changes and modifications may be made without departing from the spirit and scope of the invention. Thus, by way of example, and not of limitation, the template size may be somewhat larger or smaller than the nine bits shown in FIGS. 11 through 13, and the interleaved or intermediate pixel dots may be formed by the overlapping of a greater number of pulse patterns. In addition, the system may be implemented by software, rather than by the hardware as shown herein, and alternative hardware or software configurations may be employed to accomplish the same functions. It is further noted that instead of, or in addition to changing the duration of the pulses, the shape and/or the energy level of the laser beam may be changed; the placement of the pulse within the pixel length or duration may be shifted; and multiple pulses may be located within a single pulse length or duration. The high frequency energy source may be modulated in its frequency and/or its phase to change the resultant energy distribution. Also, it is again noted that different printing or marking engines would be expected to require different templates. Further, prior pulse data may be employed in determining desired current laser pulse energization and parameters. Accordingly, the present invention is not limited to the specific embodiments shown in the drawings and as described hereinabove.

What is claimed is:

1. In a method of controlling an image creation device such as a laser printer, the device including a body presenting an actuatable surface having image regions such as pixels defined thereon, and including selectively operable actuating means for actuating respective image regions for image creation and in order to present, for each actuated region, an actuated central zone surrounded by an actuated outer zone, said actuating means being operative successively and directly along parallel lines to define a raster; the improvement which comprises the steps of actuating a proximal set of image regions extending in at least two directions, actuating the image regions at an intensity level so that the respective central zones thereof are insufficiently actuated for substantial image creation while outer zones thereof cooperatively interact to form an intermediate zone which is sufficiently actuated for image creation.

2. The improvement as set forth in claim 1, the image regions being actuatable by a beam of radiation such as laser light impinging thereon, the actuating means including means for selectively producing and directing the beam for impingement on and sweeping across each region during a predetermined sweep time period;

said improvement further including the step of modulating the beam directed for impingement on said image regions such that the beam impinges thereon for a time period sufficient to form said intermediate zone.

3. The improvement as set forth in claim 2, the image regions being configured to present a plurality of side-by-side image lines, said improvement further including the step of actuating respective image regions in adjacent ones of the image lines in order to present said image regions.

4. The improvement as set forth in claim 3, said adjacent ones of the image lines presenting an intermediate space therebetween, said improvement further including the step of forming said intermediate zone within said intermediate space.

5. Apparatus for enhancing an image formed by scanning laser beam printer producing image dots, said printer having a laser beam, said laser printer having a normal resolution comprised of a predetermined number of dots per inch including parallel laser beam scan lines with a predetermined number of scan lines per inch corresponding to said predetermined number of dots per inch; and predetermined dots-per-inch bit rate of energizing said laser beam along said scan lines, said laser beam being normally selectively energized, at said predetermined rate along said scan lines, at a predetermined dot-writing level sufficient to exceed a predetermined threshold of imaging components included in said laser printer, and also determinative of a size of the image dots, said threshold being determinative of presence or absence of dots on the image from said laser printer, and said laser printer also having means for accepting an external video signal that controls the energizing of said laser beam, said apparatus comprising:

means for providing digital signals corresponding to a double density bit map of a desired m=image to be produced by said laser printer, at a double-density resolution having twice said predetermined number of dots per inch of said laser printer;

temporary storage means, coupled to receive said digital signals, for temporarily storing at least portions of three lines from the double density bit map, with one of said three lines corresponding to a normal scan line of said laser printer and other of said three lines being desired interleaved lines above and below the one of said three lines corresponding to a normal scan line of said laser printer;

means for extracting successive sets of bits from said three lines in accordance with a template including a plurality of horizontal and a plurality of vertically extending bits, having a center of the template generally coinciding with a picture element of a pixel where the laser beam is currently directed;

logic means for decoding said sets of bits into a plurality of different values, each of said different values associated with one of a plurality of video pulse widths, some of said pulse widths being below said threshold level of said laser printer;

means for generating scan lines of video signal at twice said predetermined number of dots per inch of said laser printer, but with a number of scan lines equal to said predetermined number of scan lines per inch of said laser printer, said video signal comprised of consecutive pulses of said pulse widths corresponding to decoded values associated with combinations of said sets of bits, and at least some of said pulse widths being below a predetermined threshold level of said laser printer for producing output dots; and means for coupling said video signal to energize the laser beam of said laser printer;

whereby dots may be included in an output image from said laser printer at points between normal scan lines of said laser printer.

6. A method for utilizing a display apparatus having a nominal resolution, and for producing display apparatus output having a different resolution than the nominal resolution of said display apparatus, said nominal resolution comprised of a predetermined number of picture elements or pixels along one or more axes, comprising the steps of:

holding in a first storage means for storing data, digital signals corresponding to pixels, at a desired different output resolution, of a bit map of a desired image to be produced by said display apparatus;

selecting a plurality of actuating signals for said display apparatus, such that some of said actuating signals are below an imaging threshold of said display apparatus;

selecting a position at which said display apparatus is capable of being actuated;

selecting from said first storage means a sample subset of bits at the desired different output resolution having a predetermined number of pixels in a predetermined configuration, having said selected position in said display apparatus coincide with an approximate center of a pixel configuration;

providing a plurality of predetermined pixel templates, each template identifying a corresponding set of actuating signals for said display apparatus, and each template including at least four pixels;

selecting an actuating signal by association with one or more templates, corresponding to said sample subset, said actuating signals for said display apparatus being selected to produce output display dots corresponding to a desired image by overlap of a plurality of said actuating signals; and processing said actuating signals prior to application to said display apparatus.

7. A method for utilizing a display apparatus having a nominal resolution, and for producing display apparatus output having a different resolution than the nominal resolution of said display apparatus, said nominal resolution comprised of a predetermined number of picture elements or pixels along each of two orthogonal axes, comprising the steps of:

producing digital signals corresponding to pixels, at a desired output resolution different from said nominal resolution, of a bit map of a desired image to be produced by said display apparatus;

storing in temporary memory a plurality of consecutive lines of said bit map;

selecting a plurality of actuating signals for said display apparatus, such that some of said actuating signals are below an imaging threshold of said display apparatus;

selecting a position at which said display apparatus is capable of producing an imaging signal;

selecting from said temporary memory a sample subset having a predetermined number of pixels in a predetermined configuration, having said selected position in said display apparatus coincide with an approximate center of a pixel configuration;

storing a plurality of pixel templates, each template identifying a corresponding set of actuating signals from said display apparatus, and each template including at least four pixels;

matching said sample subset of pixels with a plurality of said templates;

generating said corresponding set of actuating signals for said display apparatus if said sample subset matches at least one of said templates;

synchronizing said storing in temporary memory, said position selection, said sample subset selection, said matching, and said generation of actuating signals, with said display apparatus.

8. Apparatus for enhancing an image produced by a scanning beam marking engine, said marking engine having a nominal resolution comprised of a predetermined number of scan lines of a scanning beam of said marking engine, with each said scan line having a predetermined number of picture elements or pixels, said scanning beam normally being energized selectively at a predetermined rate along said scan lines to yield said predetermined number of pixels, said scanning beam energization being at a predetermined dot-writing level sufficient to exceed a predetermined threshold of imaging components included in said marking engine and also being determinative of a size of image dots, said threshold being determinative of a presence or absence of dots on an output image from the marking engine, said apparatus comprising:

means for producing digital signals corresponding to pixels, at a desired output resolution different from said nominal resolution, of a bit map of a desired image to be produced by said marking engine;

temporary storage means, coupled to receive said digital signals, for temporarily storing a plurality of consecutive lines of said bit map;

means for selecting a plurality of actuating signals for said marking engine, such that some of said actuating signals are below an imaging threshold of said marking engine;

means for selecting a position at which said marking engine is capable of producing an imaging signals;

means for extracting from said temporary storage means a sample subset having a predetermined number of pixels in a predetermined configuration, having said selected position in said marking engine which coincides with an approximate center of said predetermined number of pixels in a predetermined configuration;

means for storing a plurality of pixel templates, each template identifying a corresponding set of actuating signals for said marking engine, and each template including at least four pixels;

means for matching said sample subset of pixels which a plurality of said templates;

means for generating said corresponding sets of actuating signals for said marking engine if said sample subset matches at least one of said templates;

means for generating said scan lines from said actuating signals for said marking engine; and means for synchronizing said storing in temporary storage means, said position selection, said sample subset extraction, said matching, and said generation of actuating signals, with said marking engine.

9. An apparatus as defined in claim 8 wherein said means for matching includes a lookup table.

10. An apparatus as defined in claim 8 wherein the desired output resolution is twice said nominal resolution of said scanning beam marking engine of said two axes of said display apparatus.

11. An apparatus for producing output images, said apparatus comprising:

means for forming output images made up of a series of dots by scanning along successive parallel scan lines, with a predetermined number of scan lines per inch;

means for storing a bit map of a desired image with said bit map including twice as many lines per inch parallel to said scan lines as said predetermined number;

said apparatus including a threshold level of energization for producing output dots in the coarse of scanning along said parallel scan lines;

means for producing an output image corresponding substantially to said bit map and including dots between said scan lines by scanning along said scan lines and selectively employing energization of proximate points on adjacent scan lines below the threshold level to produce dots between the scan lines by overlapping energization without producing dots on the scan lines.

12. A method of reproducing a desired image on an imaging device having a predetermined device resolution, said method comprising the steps of:

using a raster of pixels to represent said desired image, said raster having a predetermined raster resolution, said raster resolution being different from said device resolution;

providing data signals for said pixels in said raster;

providing a set of templates containing a plurality of pixels, said pixels in each template in said set of templates having a predetermined configuration, said templates having a predetermined template orientation relative to said device resolution and having a predetermined template reference point corresponding to a position at which said device is capable of being actuated, said templates having a template resolution equal to said raster resolution, and such that for each configuration of pixels, said templates in said set provide for all possible combinations of pixels in said raster;

providing data signals or said pixels in said templates in said set;

providing for said templates in said set, corresponding predetermined template imaging signals for actuating said imaging device, and such that at least some of said template imaging signals, when applied to said imaging device, cooperatively interact with other of said template imaging signal for form a multiple exposure image that corresponding to a pixel in said raster;

selecting a position at which said image device is capable of being actuated and such that said position corresponding to said template reference point;

selecting from said raster a subset of pixels having said configuration and corresponding to said selected position;

matching said subset of pixels to said templates in said set to find a matching template;

actuating said imaging device at said selected position with said template imaging signals that correspond to said matching template, to produce an exposure region on said imaging device, and such that at least some exposure regions cooperatively interact with other of said exposure regions to form a multiple exposure image, wherein said multiple exposure image reproduces on said imaging device a pixel from said raster of said desired image, and wherein no pixel is reproduced on said imaging device in at least one of the selected positions where said imaging device is actuated to produce the multiple exposure image.

13. A method for reproducing a desired image on an imaging device, said device having a surface capable of accumulating energy, and such that said device produces an image in regions corresponding to where energy accumulation on said surface exceeds a predetermined imaging threshold, and such that no substantial image is produced in regions corresponding to where energy accumulation on said surface is below said imaging threshold, said surface having predetermined energizing positions at which said device is capable of imparting energy to said surface, said energizing positions being located at predetermined intervals along one or more axes relative to said actuatable surface, said method comprising the steps of:

using a set of picture elements to represent said desired image, said picture elements having predetermined positions relative to said surface of said device, and such that at least some of said positions of said picture elements are not coincident with said energizing positions of said surface of said device;

providing exposure signals for imparting energy to said surface, such that each of said exposure signals produces an area of accumulated energy on said surface;

actuating said device with a plurality of said exposure signals in such a manner, that at least two or more of said areas that result from said actuations, cooperatively interact to form multiple-exposure regions on said surface, wherein each of said multiple-exposure regions has accumulated energy that exceeds said imaging threshold in a configuration that corresponds to one of said picture elements, and wherein for at least one of said multiple exposure regions, which is not coincident with any of said energizing positions, at least one its cooperating areas is individually below said imaging threshold, and such that collectively, all of said actuations said desired image on said device.

14. Apparatus for reproducing a desired image on an imaging device having a predetermined device resolution, said apparatus comprising:

first temporary means for storing one or more lines from a raster of pixels that represent said desired image, said raster having a predetermined raster resolution, said raster resolution being different from said device resolution;

means for providing a plurality of templates forming a set of templates containing a plurality of pixels, said pixels in said templates having a predetermined configuration, said templates having a predetermined template orientation relative to said device resolution and having a predetermined template reference point corresponding to a position at which said device is capable of being actuated, said templates having a template resolution equal to said raster resolution, and such that for each configuration of pixels, said templates in said set provide for all possible combinations of pixels in said raster;

second temporary means for storing at least some of said templates in said set of templates;

means for providing data signals for said pixels in said templates in said set;

means for providing for said templates in said set, corresponding predetermined template imaging signals for actuating said imaging device, and such that at least some of said template imaging signals, when applied to said imaging device, cooperatively interact with other of said template imaging signals to form a multiple exposure image, that corresponding to a pixel in said rater;

means for selecting a position at which said imaging device is capable of being actuated and such that said position corresponds to said template reference point;

means for selecting from said raster a subset of pixels having said configuration and corresponding to said selected position;

logic means for matching said subset of pixels to said templates in said set to find a matching template;

means for actuating said imaging device at said selected position with said template imaging signals that correspond to said matching template, to produce an exposure region on said imaging device, and such that at least some of said exposure regions cooperatively interact with other of said exposure regions to form a multiple exposure image;

whereby said multiple exposure image reproduces on said imaging device a pixel from said raster of said desired image.

* * * * *